(12) United States Patent
Salter et al.

(10) Patent No.: US 11,884,179 B2
(45) Date of Patent: Jan. 30, 2024

(54) BIDIRECTIONAL ENERGY TRANSFER SYSTEM AND METHOD THAT UTILIZE A SUPPLY DEVICE

(71) Applicant: Ford Global Technologies, LLC, Dearborn, MI (US)

(72) Inventors: Stuart C. Salter, White Lake, MI (US); Ryan J. O'Gorman, Beverly Hills, MI (US); Timothy Harris, Grosse Ile, MI (US); Peter Phung, Windsor (CA); Katherine Howard-Cone, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 17/492,940

(22) Filed: Oct. 4, 2021

(65) Prior Publication Data

US 2023/0105472 A1 Apr. 6, 2023

(51) Int. Cl.
*B60L 55/00* (2019.01)
*B60L 53/14* (2019.01)

(52) U.S. Cl.
CPC .............. *B60L 55/00* (2019.02); *B60L 53/14* (2019.02); *B60L 2210/12* (2013.01); *B60L 2210/14* (2013.01); *B60L 2210/40* (2013.01)

(58) Field of Classification Search
CPC ...... B60L 55/00; B60L 53/14; B60L 2210/12; B60L 2210/14; B60L 2210/40; B60L 53/30; Y02T 10/70; Y02T 10/7072; Y02T 90/14

USPC ......................................................... 320/109
See application file for complete search history.

(56) References Cited

U.S. PATENT DOCUMENTS

| 9,077,052 | B2 | 7/2015 | Reddy | |
|---|---|---|---|---|
| 10,284,006 | B2 | 5/2019 | Toyoda | |
| 2013/0107598 | A1* | 5/2013 | Rojas | H02J 3/1814 363/131 |
| 2014/0334522 | A1* | 11/2014 | Meiser | H10N 19/00 374/178 |
| 2017/0057369 | A1 | 3/2017 | Næsje et al. | |
| 2018/0281607 | A1* | 10/2018 | Galin | B60L 53/57 |
| 2020/0062138 | A1 | 2/2020 | Smolenaers | |
| 2020/0067319 | A1 | 2/2020 | Qin et al. | |
| 2021/0036536 | A1* | 2/2021 | Ruppert | H02J 7/0013 |
| 2023/0045130 | A1* | 2/2023 | Abolhassani | H02M 1/327 |

FOREIGN PATENT DOCUMENTS

CN 111313448 A 6/2020

\* cited by examiner

*Primary Examiner* — Paul Dinh
(74) *Attorney, Agent, or Firm* — David B. Kelley; Carlson, Gaskey & Olds, P.C.

(57) ABSTRACT

A bidirectional energy transfer system includes a supply device having a vehicle port, an inverter port, a converter, and an isolation transformer. The vehicle port is configured to electrically couple the supply device to an electrified vehicle. The inverter port is configured to electrically couple the supply device to an inverter that is separate from the supply device.

14 Claims, 2 Drawing Sheets

BIDIRECTIONAL ENERGY TRANSFER SYSTEM AND METHOD THAT UTILIZE A SUPPLY DEVICE

TECHNICAL FIELD

This disclosure relates generally to systems used to transfer electrical energy to and from an electrified vehicle.

BACKGROUND

Electrified vehicles differ from conventional motor vehicles because they are selectively driven by one or more electric machines that are powered by at least one traction battery. The electric machines can propel the electrified vehicles instead of, or in combination with, an internal combustion engine. Plug-in type electrified vehicles include one or more charging interfaces for charging the traction battery pack. Plug-in type electrified vehicles are commonly charged while parked at a charging station or some other utility power source. Typically, charging stations are only capable of charging one vehicle at a time.

SUMMARY

A bidirectional energy transfer system includes, among other things, a supply device having a vehicle port, an inverter port, a converter, and an isolation transformer. The vehicle port is configured to electrically couple the supply device to an electrified vehicle. The inverter port is configured to electrically couple the supply device to an inverter that is separate from the supply device.

In another example of the foregoing system, the converter is a DC-to-DC buck-boost converter.

Another example of any of the foregoing systems includes a housing that holds the converter and the isolation transformer. The inverter is outside the housing.

In another example of any of the foregoing systems, the supply device is configured to transition back and forth between a first output configuration and a second output configuration. In the first output configuration, the inverter port electrically couples the supply device to the inverter. The inverter is a first inverter. In the second output configuration, the inverter port electrical couples the supply device to a second inverter that is different than the first inverter.

In another example of any of the foregoing systems, the supply device is configured to transition back and forth between the first output configuration, the second output configuration, and a third output configuration. In the first output configuration, the inverter can be electrically coupled to an AC grid infrastructure. In the third output configuration, the inverter port electrically couples the supply device to a nongrid storage device.

In another example of any of the foregoing systems, the nongrid storage device is a home energy storage device.

In another example of any of the foregoing systems, the supply device is configured to transition back and forth between a first input configuration and a second input configuration. In the first input configuration, the vehicle port electrically couples the supply device to the electrified vehicle. The electrified vehicle is a first electrified vehicle. In the second input configuration, the vehicle port electrically couples the supply device to a second electrified vehicle. The first electrified vehicle has a first traction battery with a first voltage. The second electrified vehicle has a second traction battery with a second voltage. The first voltage is different than the second voltage.

In another example of any of the foregoing systems, the first voltage is 800 Volts, and the second voltage is 400 Volts.

In another example of any of the foregoing systems, the inverter port comprises a multi-lug output interface.

In another example of any of the foregoing systems, the supply device is configured to transition back and forth between a first output configuration and a second output configuration. In the first output configuration, the inverter port electrically couples the supply device to the inverter. The inverter is a first inverter. In the second output configuration, the inverter port electrically couples the supply device to the inverter and a second inverter.

Another example of any of the foregoing systems includes a plurality of switches that transition to control the electrical coupling of the first and second inverters to the supply device.

In another example of any of the foregoing systems, the plurality of switches are a plurality of insulate-gate bipolar transistors.

In another example of any of the foregoing systems, the electrified vehicle is electrically coupled to the vehicle port. The system further includes a power source electrically coupled to the inverter port. The supply device is configured to charge the electrified vehicle from the power source.

Another example of any of the foregoing systems includes the electrified vehicle as a first electrified vehicle. The first electrified vehicle is electrically coupled to the vehicle port. The system still further comprises a second electrified vehicle electrically coupled to the inverter port. The supply device is configured to charge a traction battery of the second electrified vehicle from a traction battery of the first electrified vehicle.

In another example of any of the foregoing systems, an electrical input to the supply device is DC and an electrical output from the supply device is DC.

A bidirectional energy transfer method according to yet another exemplary embodiment of the present disclosure includes, among other things, electrically connecting a vehicle port of a supply device to an electrified vehicle. The method further includes, within the supply device, bucking or boosting an input voltage from the electrified vehicle, and providing an output voltage from the supply device to an inverter that is electrically coupled to the supply device.

Another example of any of the foregoing methods includes electrically isolating the electrified vehicle from the inverter using an isolation transformer within the supply device.

In another example of any of the forgoing methods, the inverter is a first inverter. The method further includes additionally providing an output voltage from the supply device to a second inverter that is electrically coupled to the supply device In another example of any of the foregoing methods, the first and second inverters are coupled to an inverter port of the supply device during the providing.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Bidirectional energy transfer systems are, generally, systems that allow an electrified vehicle to to the pass charging power to, for example, another vehicle or an external storage device. Sometimes, bidirectional energy transfer systems can be used to concurrently charge multiple vehicles from a single charge source.

This disclosure is directed toward a bidirectional energy transfer system having Electric Vehicle Supply Equipment (EVSE) that can be reconfigured to accommodate various different voltage architectures (e.g. 300 Volt, 400 Volt, 800 Volt, etc.) and battery architectures. These and other features of this disclosure are discussed in greater detail in the following paragraphs of this detailed description.

Figure 1:
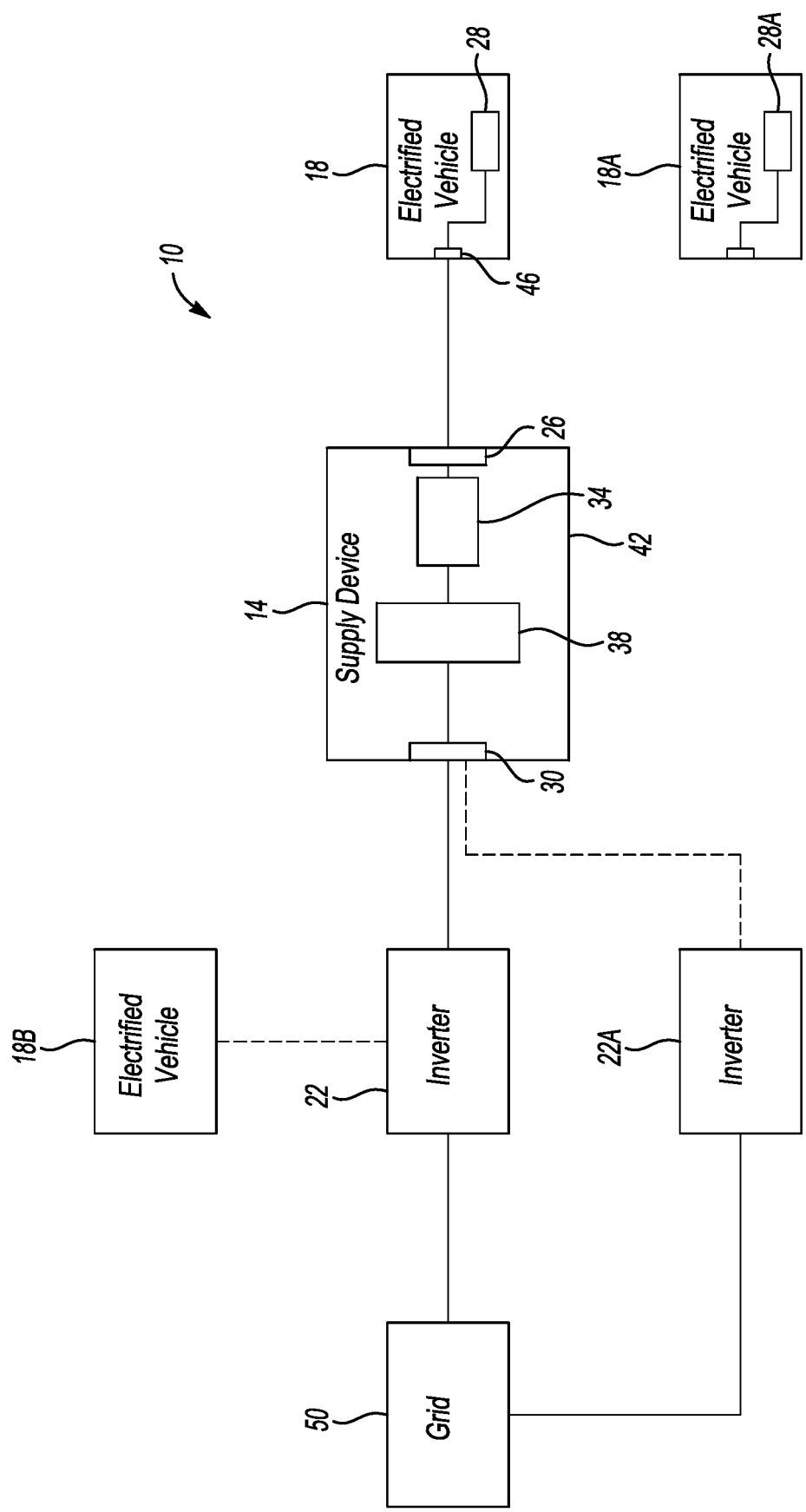
FIG. 1 illustrates a highly schematic view of a bidirectional energy transfer system according to an exemplary aspect of the present disclosure.

FIG. 1 shows an exemplary bidirectional energy transfer system 10 (hereinafter "system 10") for transferring energy.

The system 10, in the exemplary embodiment, includes a supply device 14 that can electrically couple an electrified vehicle 18 to an inverter 22 that is separate from the supply device 14. The exemplary supply device 14 includes a vehicle port 26, an inverter port 30, a converter 34, an isolation transformer 38, and a housing 42.

The vehicle port 26 couples the supply device 14 to the electrified vehicle 18 such that the supply device 14 is electrically connected to the electrified vehicle. The vehicle port 26 can electrically connect to the vehicle 18 through a charge port 46 of the electrified vehicle 18, for example.

The supply device 14 is configured to transition back and forth between a first input configuration and a second input configuration. In the first input configuration, the vehicle port 26 electrically couples the supply device 14 to the electrified vehicle 18. In the second input configuration, the vehicle port 26 electrically couples the supply device 14 to a second electrified vehicle 18A.

The first electrified vehicle 18 has a traction battery 28 with a first voltage. The second electrified vehicle 18A has a traction battery 28A with a second voltage. The first voltage is different than the second voltage. In this example, the first voltage is 800 Volts and the second voltage is 400 Volts.

The inverter port 30 couples the supply device 14 to the inverter 22. The inverter port 30 could electrically connect to a high-voltage bus of the inverter 22, for example. The inverter port 30 can be a multi-lug output interface or connection.

The inverter port 30 can selectively connect the supply device 14 to the inverter 22 (i.e., a single inverter) or to the inverter 22 and at least one other inverter 22A (i.e., a plurality of inverters). The inverter port 30 can be a universal multi-lug output connection to facilitate connecting to the inverter 22, the inverter 22A, or both.

In an example, the supply device 14 can transition back and forth between a first output configuration and a second output configuration. In the first output configuration, the inverter port 30 electrically couples the supply device 14 to the inverter 22. The inverter 22 can then convey electrical power to a grid infrastructure 50, such as an AC grid infrastructure.

In the second output configuration, the inverter port 30 electrical couples the supply device 14 to an inverter 22A, which is also electrically connected to the grid infrastructure 50.

In some examples, the inverter 22 is electrically coupled to another electrified vehicle 18B. The electrified vehicle 18 can then charge the traction battery of the other electrified vehicle 18B through the supply device 14 and inverter 22.

In some examples, the inverter port 30 can electrically couple the supply device 14 to both the inverter 22 and the inverter 22A at the same time.

The supply device 14 can thus convey electrical energy from the electrified vehicle 18 The supply device 14 can also be used to charge the traction battery 28 of the electrified vehicle 18. For example, when the vehicle port 26 is electrically coupled to the electrified vehicle 18, and when the inverter port 30 is electrically coupled to the inverter 22, the supply device 14 can recharge the traction battery 28 from the grid infrastructure 50.

In some examples, the system 10 can be considered a "common rail" having a plurality of devices (e.g., electrified vehicle 18, supply device 14, inverter 22) with the capability to conduct sources of energy to a central known and fixed voltage depending on the direction of current.

In this example, the converter 34 is a DC-to-DC buck-boost converter. The converter 34 can receive an input voltage through the vehicle port 26. The converter 34 can then provide an output voltage having a magnitude that is either greater than or less than a magnitude of the input voltage. The input voltage from the vehicle 18 is thus bucked, boosted, or both within the supply device 14.

The isolation transformer 38 is part of the supply device 14, not the inverter 22. The isolation transformer 38, in this example, can receive the output voltage from the converter 34 and provide the output voltage to the inverter port 30. The isolation transformer 38 can help to protect against voltage spikes and can facilitate system control—including floating voltage regulation (instead of common earth—ground potential). This can help to maintain voltage at a nominally constant level during energy transfer.

In this example, the input voltage received by the supply device 14 is DC and the output voltage is DC. In another example, the input voltage, the output voltage, or both, could be AC.

The example housing 42 holds the converter 34 and the isolation transformer 38 within an interior 52 of the housing 42. The inverter 22 that connects to the supply device 14 is outside the interior 52 of the housing 42.

Figure 2:
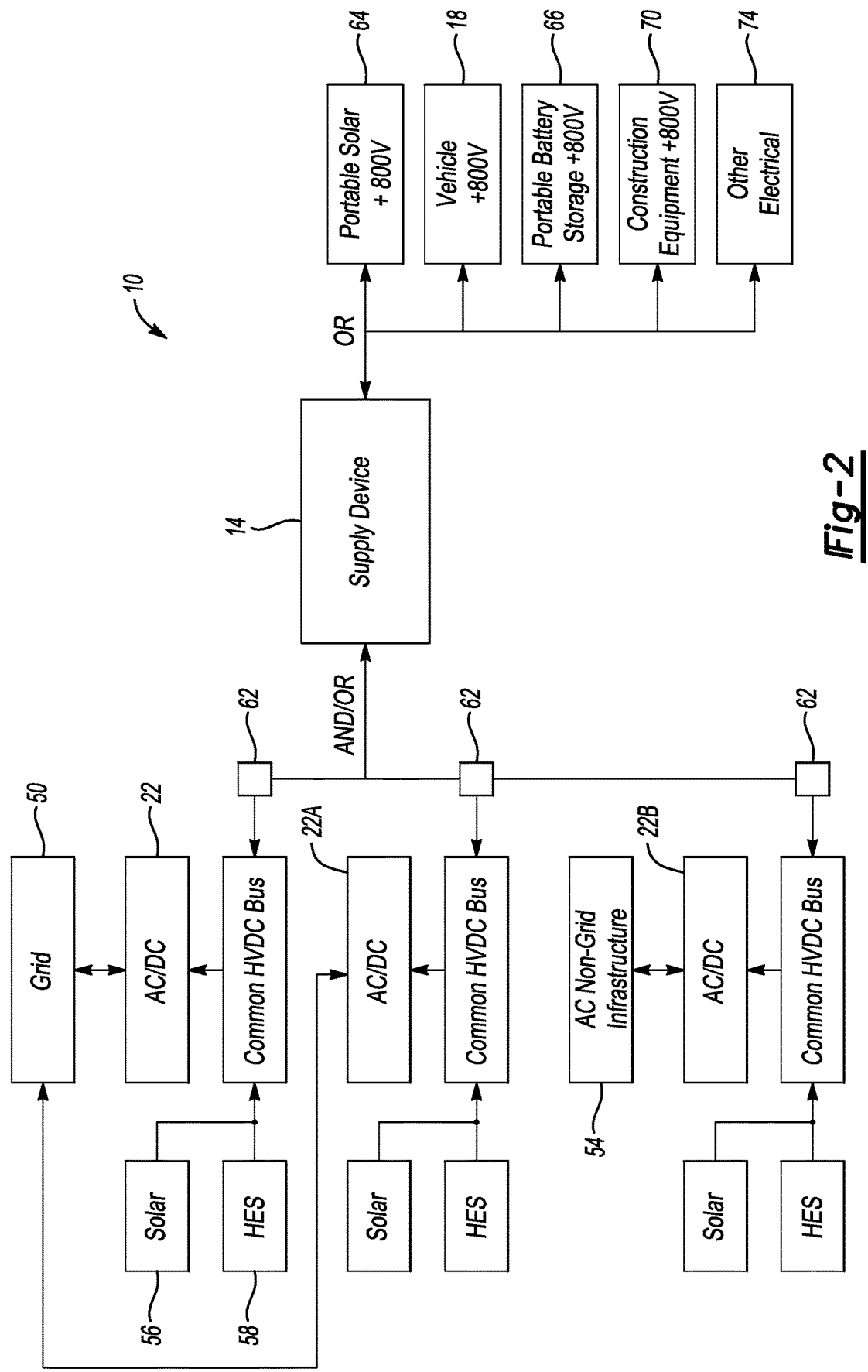
FIG. 2 illustrates a highly schematic view of the bidirectional energy system of FIG. 1.

With reference to FIG. 2, in an example, the supply device 14 can transition to other output configurations from the first output configuration or from the second output configuration. In another output configuration, the supply device 14 is electrically coupled to an inverter 22B that is not tied to the grid infrastructure 50, but instead electrically coupled to a nongrid storage device 54 such as off-grid structures (homes, boats, sheds, etc.), portable construction equipment/offices, stationary battery storage, etc.

A plurality of switches 62 can be used to control the electrical coupling of the first inverter 22, second inverter 22A, and third inverter 22B to the supply device 14. The switches 62 can be insulated-gate bipolar transistors (IGBTs) for example. In some examples, the switches 62 are silicon carbide IGBTs. The switches 62 can enables added charge flexibility through inverter multiplex control (AND/OR gates, for example). The switches 62 are shown as outside the supply device 14. The switches 62 could be inside or part of the supply device 14 in another example.

In some examples, the system 10 having the supply device 14 can be considered a bidirectional power transfer system. In may include various equipment in additional to that described above, such as a motor controller (which may be referred to as an inverter system controller or ISC), contactors, relays, etc., arranged and configured to establish the bidirectional transfer of electrical energy between the respective participating vehicles of the system 10.

As shown in FIG. 2, the inverters 22, 22A, and 22B can transfer energy to the supply device 14 and on to the vehicle 18 from sources other than the grid infrastructure 50. The inverters 22, 22A, 22B can transfer energy from a solar source 56 or from a Home Energy Storage (HES) system 58, for example.

The supply device 14 can be connected to the vehicle 18 or the vehicle 18A as previously described in connection with FIG. 1. The supply device 14 can electrically connect to other electrical assemblies as well, such as an 800 Volt portable solar 64, 800 Volt portable battery storage 66, 800 Volt construction equipment 70, or other electrical assemblies 74.

In an example, a user is utilizing the supply device 14 with the inverter 22 and deenergizing the system 10 to prepare for adding a connection to the inverter 22A. After a connection between the inverter 22A and the inverter port 30 of the supply device 14 is established, communications between inverter 22A and the supply device 14 will begin such that the inverter 22A can transmit specifications (e.g. Voltage rating, charge capability etc.) to the supply device 14. This connection and communication approach will be repeated if additional inverters, such as the inverter 22B, are added.

The inverter port 30 can include a pin junction connection designated for each of the connected inverters, "inverter 1," "inverter 2," etc.

The supply device 14 can communicate with one or more of the inverters 22, 22A, 22B via wired/CAN/Ethernet communications, Wi-Fi (readily available), Bluetooth/BLE, wireless ad hoc networks over Wi-Fi, wireless mesh networks, low power long-range wireless (LoRa), ZigBee (low power, low data rate wireless)

A control system of the supply device 14 can be used to communicate input/output sources that are connected to the supply device 14. For example, an AC Infrastructure, portable solar array, HES, AC Non-Grid Infrastructure, etc.), connections with other electrified vehicles, 800 Volt connections (e.g. Portable Solar Arrays, BPT vehicles, Portable Storage Units, Construction Equipment, Other DC devices/vehicles etc.). Once a determination of transfer flow control is established, a control signal can, in this example, instruct IGBTs to transition to a desired state and enable/disable inverters as required For example, if the control system determines that transferring energy to 800 Volt electrical system vehicle is required, an algorithm can be used to determine that combining inverter 22 and inverter 22A would meet the 800 Volt requirement. The control signal can then instruct the IGBTs to activate inverter 22 and inverter 22A while blocking inverter 22B.

Some features of the exemplary embodiments described above include a reconfigurable EVSE device that can electrically connect to one inverter, or to several inverters. This expandable EVSE design can increase flexibility and reliability. The expandable EVSE design helps to accommodate various inverter sizes and configurations to support different voltage requirements. Rather than being limited to the inverter package which contains the AC/DC, common HVDC bus and DC/DC for fixed transfer limit, the expandable EVSE can allow a user to swap/add/remove inverters to adapt to particular voltage needs. For example, by adjusting inverters used with the supply device, the user can change the supply device to be useable with an 800 Volt traction battery rather than a 400 Volt traction battery.

The supply device can support energy transfer to not just electrified passenger vehicles, but also electrified high-voltage industrial/commercial vehicle/systems (e.g. bulldozers, excavators, forklifts/hi-los etc.). Industrial/commercial equipment (e.g. DC powered tools, electrified products etc.).

The supply device, or reconfigurable EVSE device, can include an isolation transformer. Thus, the isolation transformer can be moved out of the inverter. Utilizing universal connectors and substantially modular design allows for added capability for higher voltage components/devices and future proofing.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A bidirectional energy transfer system, comprising:
a supply device having a housing, a vehicle port, an inverter port, a converter, and an isolation transformer, the vehicle port configured to electrically couple the supply device to an electrified vehicle so that the supply device can receive an input voltage from the electrified vehicle, the inverter port configured to electrically couple the supply device to an inverter that is separate from the supply device so that the supply device can provide an output voltage to the inverter, the housing holding the converter and the isolation transformer, the inverter outside the housing.

2. The bidirectional energy transfer system of claim 1, wherein the converter is a DC-to-DC buck-boost converter.

3. The bidirectional energy transfer system of claim 1, wherein the supply device is configured to transition back and forth between a first output configuration and a second output configuration,
in the first output configuration, the inverter port electrically couples the supply device to the inverter, the inverter a first inverter, and,
in the second output configuration, the inverter port electrical couples the supply device to a second inverter that is different than the first inverter.

4. The bidirectional energy transfer system of claim 3, wherein the supply device is configured to transition back and forth between the first output configuration, the second output configuration, and a third output configuration, in the third output configuration, wherein the inverter port electrical couples the supply device to a nongrid storage device.

5. The bidirectional energy transfer system of claim 4, wherein the nongrid storage device is a home energy storage device.

6. The bidirectional energy transfer system of claim 1, wherein the supply device is configured to transition back and forth between a first input configuration and a second input configuration,
in the first input configuration, the vehicle port electrically couples the supply device to the electrified vehicle, the electrified vehicle a first electrified vehicle, and,
in the second input configuration, the vehicle port electrically couples the supply device to a second electrified vehicle, the first electrified vehicle having a first traction battery with a first voltage, the second electrified vehicle having a second traction battery with a second voltage, the first voltage is different than the second voltage.

7. The bidirectional energy transfer system of claim 6, wherein the first voltage is 800 Volts, wherein the second voltage is 400 Volts.

8. The bidirectional energy transfer system of claim 1, wherein the inverter port comprises a multi-lug output interface.

9. The bidirectional energy transfer system of claim 1, wherein the supply device is configured to transition back and forth between a first output configuration and a second output configuration,
- in the first output configuration, the inverter port electrically couples the supply device to the inverter, the inverter a first inverter, and,
- in the second output configuration, the inverter port electrically couples the supply device to the inverter and a second inverter.

10. The bidirectional energy transfer system of claim 9, further comprising a plurality of switches that transition to control the electrical coupling of the first and second inverters to the supply device.

11. The bidirectional energy transfer system of claim 10, wherein the plurality of switches are a plurality of insulated-gate bipolar transistors.

12. The bidirectional energy transfer system of claim 1, further comprising the electrified vehicle electrically coupled to the vehicle port, and further comprising a power source electrically coupled to the inverter port, wherein the supply device is configured to charge the electrified vehicle from the power source.

13. The bidirectional energy transfer system of claim 1, further comprising the electrified vehicle as a first electrified vehicle, the first electrified vehicle electrically coupled to the vehicle port, and still further comprising a second electrified vehicle electrically coupled to the inverter port, wherein the supply device is configured to charge a traction battery of the second electrified vehicle from a traction battery of the first electrified vehicle.

14. The bidirectional energy transfer system of claim 1, wherein an electrical input to the supply device is DC and an electrical output from the supply device is DC.

* * * * *